(12) United States Patent
Lindell et al.

(10) Patent No.: US 9,882,373 B2
(45) Date of Patent: Jan. 30, 2018

(54) SYSTEM FOR PROTECTION OF DRY TYPE TRANSFORMERS

(71) Applicant: ABB Schweiz AG, Baden (CH)

(72) Inventors: Elisabeth Lindell, Vasteras (SE); Lars Liljestrand, Vasteras (SE); Felix Greuter, Baden-Rutihof (CH)

(73) Assignee: ABB Schweiz AG, Baden (CH)

( * ) Notice: Subject to any disclaimer, the term of this patent is extended or adjusted under 35 U.S.C. 154(b) by 236 days.

(21) Appl. No.: 14/550,394

(22) Filed: Nov. 21, 2014

(65) Prior Publication Data
US 2016/0149396 A1    May 26, 2016

(51) Int. Cl.
| | |
|---|---|
| *H02H 9/04* | (2006.01) |
| *H02H 9/00* | (2006.01) |
| *H01F 27/34* | (2006.01) |
| *H01F 27/40* | (2006.01) |

(52) U.S. Cl.
CPC ........... *H02H 9/005* (2013.01); *H01F 27/343* (2013.01); *H01F 27/40* (2013.01); *H02H 9/04* (2013.01)

(58) Field of Classification Search
CPC ................................. H02H 9/005; H02H 9/04
See application file for complete search history.

(56) References Cited

U.S. PATENT DOCUMENTS

| | | | | |
|---|---|---|---|---|
| 4,096,366 A | * | 6/1978 | Titus ...................... | H02H 7/222 218/122 |
| 4,604,673 A | | 8/1986 | Schoendube | |
| 5,220,480 A | * | 6/1993 | Kershaw, Jr. ............ | H01C 7/12 361/117 |
| 6,624,997 B1 | * | 9/2003 | Llanos .................. | H01F 27/343 307/105 |
| 2002/0158744 A1 | * | 10/2002 | Ngo ..................... | H01F 41/0213 336/234 |

FOREIGN PATENT DOCUMENTS

| | | | |
|---|---|---|---|
| GB | 2506121 | * | 3/2014 |
| JP | S5680109 A | | 7/1981 |
| JP | S61190910 A | | 8/1986 |
| JP | H0515056 A | | 1/1993 |
| WO | 9747064 A1 | | 12/1997 |

* cited by examiner

*Primary Examiner* — Scott Bauer
(74) *Attorney, Agent, or Firm* — Whitmyer IP Group LLC

(57) ABSTRACT

A system for transient over voltage protection of a three-phase transformer. Two surge arresters are series connected across each winding of the transformer and the center point connection of the two surge arresters is electrically connected to a middle location of the winding. Three additional surge arresters are electrically connected from each phase to ground in the case of either a delta or Y connected transformer; and/or connected from a neutral point to ground in the case of a Y connected transformer. The system allows for all of the surge arresters to be packaged as an integrated surge arrester system to minimize induced transient over voltages and high stresses on the transformer winding due to internal resonances.

38 Claims, 17 Drawing Sheets

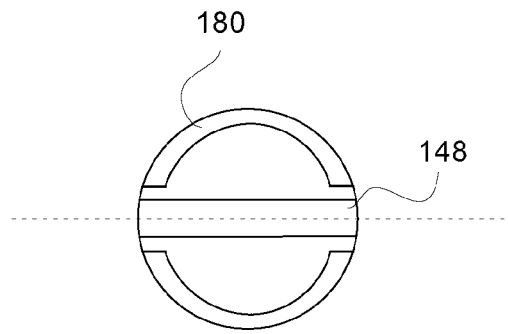
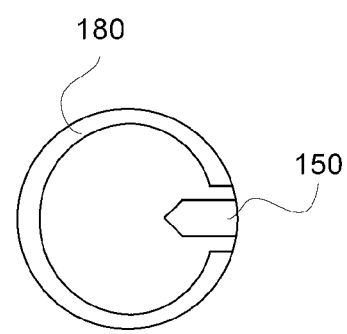
Figure 8B
Figure 8C
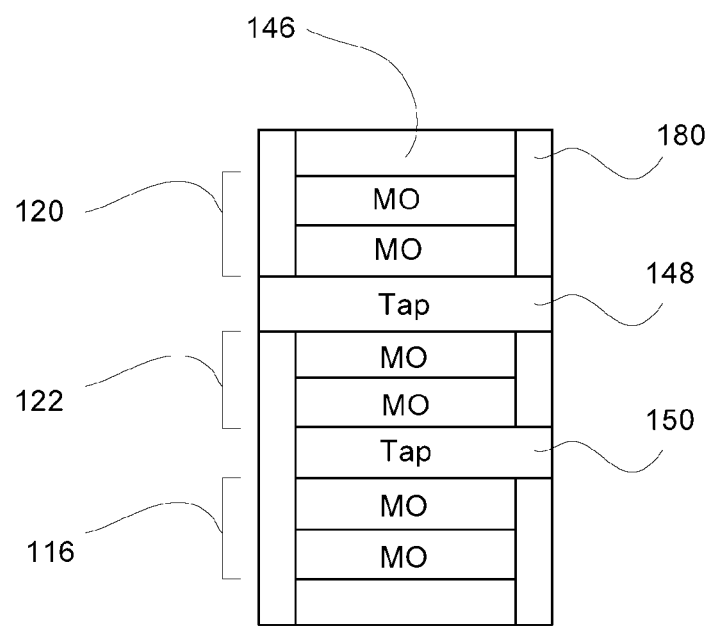
Figure 8A

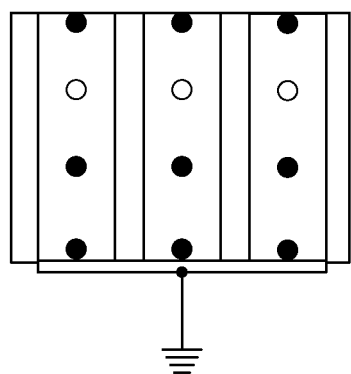
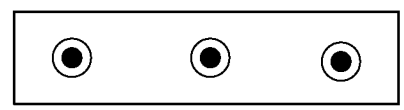
Figure 9C
Figure 9D
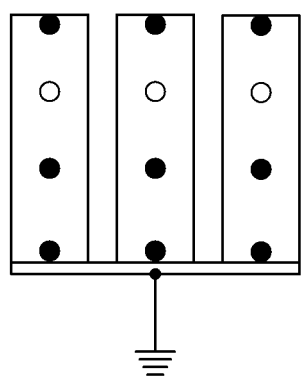
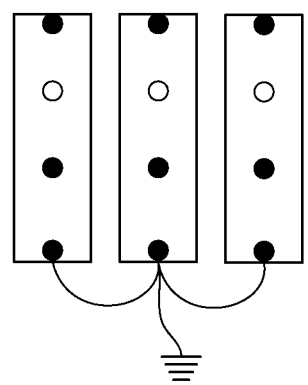
Figure 9A
Figure 9B

SYSTEM FOR PROTECTION OF DRY TYPE TRANSFORMERS

FIELD OF THE INVENTION

The system is directed toward a transient over voltage protection system for a transformer, and more particularly, to an over voltage protection system for a three-phase delta or Y connected transformer that suppresses over voltages on the transformer windings caused by internal resonances.

BACKGROUND OF THE INVENTION

Dry transformers are commonly used in medium voltage power systems and vacuum type circuit breakers are often utilized in connection with dry transformers. Vacuum circuit breakers could, during certain conditions, cause over voltage conditions when used for operating the transformer. These over voltages could cause transformer insulation failure when transient over voltage protection is not installed. Common transient over voltage protection includes surge arresters and oil-filled surge capacitors and damped surge capacitors (RC-snubbers).

One problem with the use of vacuum circuit breakers is that induced transient over voltages can be induced. This is especially the case when vacuum circuit breakers are opened with inductive loads attached to the system at phase angles causing multiple re-ignitions. Opening during the transformer inrush current or during a short circuit on the secondary side of the transformer are other examples of "inductive loads" not commonly thought of. Even though surge arresters may be utilized to limit transient voltage amplitudes at the point of installation, high stresses could be reached inside the transformer winding due to internal resonances.

Additionally, dry type transformers are now being used so as to avoid the problems associated with oil-filled transformers typically used in conventional medium voltage systems. Oil filled transformers present unique problems that dry transformers do not, for example, possible leakage of the oil creating environmental issues, and the possibility that the oil might catch fire such that, explosion proof transformers are often preferred today. Accordingly, when utilizing dry transformers it is of course highly undesirable to utilize oil filled surge capacitors, which present the same or similar problems discussed in connection with oil filled transformers although the oil quantity is much less for the capacitor compared to the transformer.

U.S. Pat. No. 4,604,673 (the '673 patent) discloses a distribution transformer that includes a surge protection device for protecting against external lightning strikes. For example, the '673 patent describes an oil filled transformer equipped with a varistor stack mounted within the oil tank and connected between a midpoint of the winding, and two ends of the winding. However, the '673 patent fails to disclose or teach a protection system that is capable of protecting against internal resonances developed within a dry type three phase transformer. Rather, the '673 patent is directed toward protecting oil filled single phase overhead (pole-type) distribution against external lightning strikes. Col. 1, ll. 16-19 and 62-66. Likewise, the single phase system disclosed in the '673 patent could not be adapted in a three phase delta connected transformer. However, this is not an issue for the system taught in the '673 patent as it is a single phase system utilizing an oil filled transformer.

SUMMARY OF THE INVENTION

What is needed then, is a transient over voltage protection system for use with a dry type three phase delta or Y connected transformer.

It is further desired to provide an over voltage protection system that protects against induced transient over voltages caused by vacuum circuit breaker operations for energizing and disconnecting a transformer with attached inductive loads.

It is still further desired to provide an over voltage protection system that accounts for interruption of transformer inrush currents and short circuits on the secondary side of the transformer.

It is yet further desired to provide an over voltage protection system that protects against induced transient over voltages caused by internal resonances in a three phase transformer.

Accordingly a new configuration of protective devices is provided for use with dry type transformers. Surge arresters that are connected across the windings of the transformer are split into multiple surge arresters (e.g., two or more) so that there are connections at one or more locations along the winding, in addition to the connections at the winding terminals. One example is that the surge arresters that are connected across the windings of the transformer are split into two so that there is a connection at a middle location of the winding. The term "middle" location is defined as a variable location along the distance of the winding having a length (L) that is located anywhere from one fourth L (L/4) to three fourths L (3 L/4).

It should be understood that the connection of surge arresters to the middle locations of the windings will effectively damp the main resonance of the winding and prevent over voltages due to, for example, internal resonances.

Additionally, whereas the '673 patent is directed toward a system for protection against lightning impulse stress, which is a single impulse stress; the present invention is directed toward a system to protect the transformer against multiple circuit breaker re-ignitions causing repetitive impulses which could cause amplification of internal resonances. The connection of surge arresters to the winding middle locations will function to damp any such resonances.

Accordingly, a transient over voltage protection system for a three-phase delta or Y connected transformer is provided that for at least two series-connected surge arresters to be connected across each of the transformer windings. It is further contemplated that a center point connection of the two series-connected surge arresters may be electrically connected to a middle location of the corresponding transformer winding.

The system includes three groupings (one for each winding) of two series-connected surge arresters for a total of six surge arresters for the delta connected three phase transformer. It is contemplated that each of group of two series-connected surge arresters may be provided in a single housing having three terminals. The first terminal corresponds to one end of the first surge arrester; the second terminal corresponds to one end of the second surge arrester; and the third terminal corresponds to the center point connection of the two series-connected surge arresters.

It is still further contemplated that the three groups of surge arresters could each be mechanically affixed to a plate for ease of installation of the over voltage protection system. In other configurations, the three groups of surge arresters could also be electrically coupled, in addition to being mechanically affixed, to the plate. Additionally, in another embodiment, the three groups of surge arresters could be contained in a monolithic housing structure.

Each group of surge arresters could also be provided with at least one arrester tap that may correspond to the center point connection of the two-series connected surge arresters. The arrester tap may provide for both electrical connection and mechanical fixation of the surge arresters and may comprise, for example, a metal plate.

It is still further contemplated that each housing of each group of surge arresters may also comprise means for mechanical fixation of the over voltage protection system.

For this application the following terms and definitions shall apply:

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

In one advantageous embodiment a system for transient over voltage protection of a three-phase transformer is provided, the transformer including first, second and third windings, which may comprise, for example, high voltage windings. The system comprises a first surge arrester having first and second ends and a second surge arrester having first and second ends. The system is provided such that the first end of the first surge arrester is electrically connected to a first end of the first winding, and the second end of the first surge arrester electrically connected to a middle location of the first winding. The system is also provided such that the first end of the second surge arrester is electrically connected to a second end of the first winding, and the second end of the second surge arrester electrically connected to the middle location of the first winding. The system further comprises a third surge arrester having first and second ends and a fourth surge arrester having first and second ends. The system is provided such that the first end of the third surge arrester is electrically connected to a first end of the second winding, and the second end of the third surge arrester is electrically connected to a middle location of the second winding. The system is still further provided such that the first end of the fourth surge arrester is electrically connected to a second end of the second winding, and the second end of the fourth surge arrester is electrically connected to the middle location of the second winding. The system still further comprises a fifth surge arrester having first and second ends and a sixth surge arrester having first and second ends. The system is provided such that the first end of the fifth surge arrester is electrically connected to a first end of the third winding, and the second end of the fifth surge arrester is electrically connected to a middle location of the third winding. Finally, the system is provided such that the first end of the sixth surge arrester is electrically connected to a second end of the third winding, and the second end of the sixth surge arrester is electrically connected to the middle location of the third winding.

Other objects of the invention and its particular features and advantages will become more apparent from consideration of the following drawings and accompanying detailed description.

BRIEF DESCRIPTION OF THE DRAWINGS

FIG. 8A is an illustration of a surge arrester according to FIG. 7A.

FIG. 8B is an illustration of a surge arrester according to FIG. 8A.

FIG. 8C is an illustration of a surge arrester according to FIG. 8A.

FIG. 9A is an illustration of the system for over voltage protection according to FIGS. 5 and 10.

FIG. 9B is an illustration of the system for over voltage protection according to FIGS. 5 and 10.

FIG. 9C is an illustration of the system for over voltage protection according to FIGS. 5 and 10.

FIG. 9D is an illustration of a top view of the system for over voltage protection according to FIG. 9C.

DETAILED DESCRIPTION OF THE INVENTION

Figure 1:
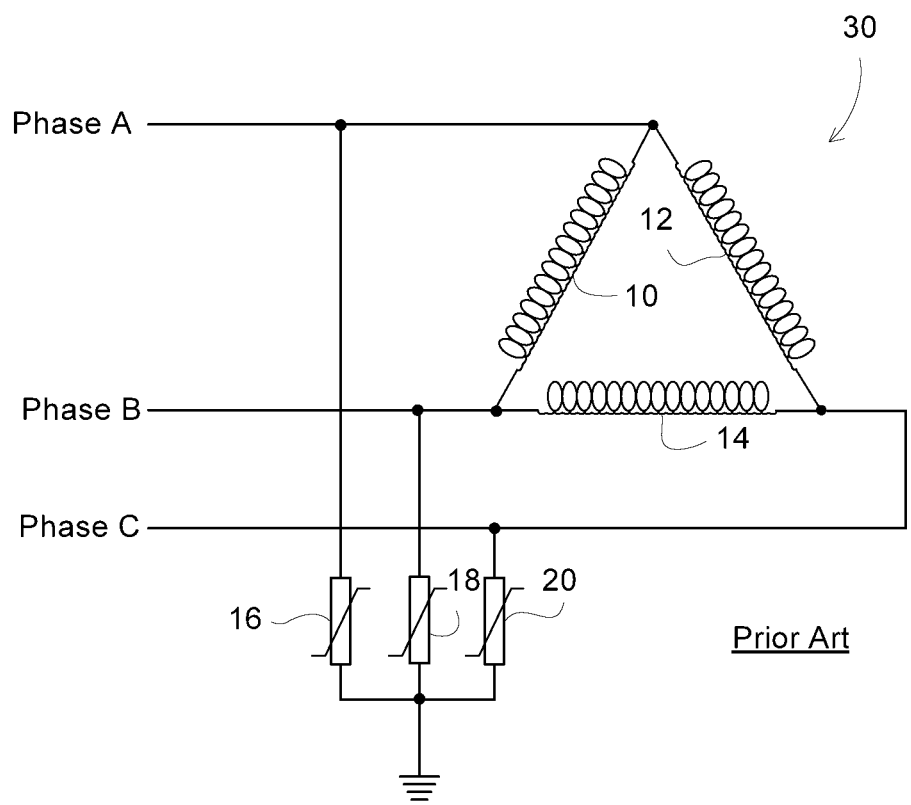
FIGS. 1 and 2 are schematic diagrams of configurations in the prior art.

Referring now to the drawings, wherein like reference numerals designate corresponding structure throughout the views.

Figure 2:
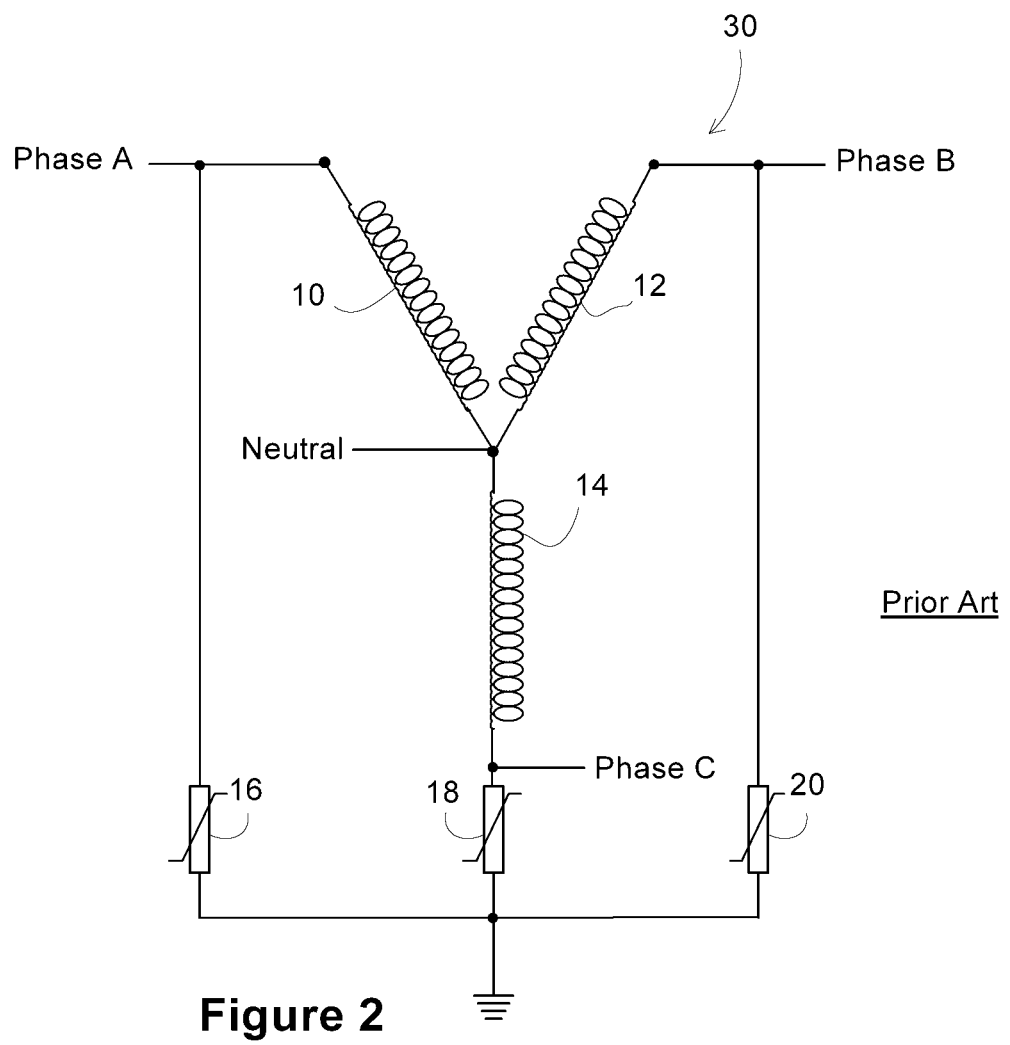

FIGS. 1 and 2 each depict a known surge arrester system 30 according to the prior art. A three phase delta-connected transformer (FIG. 1) having three windings 10, 12, 14 is provided with surge arresters 16, 18, 20 each electrically connected from one of the respectively phases to ground. Alternatively, FIG. 2 depicts a three phase Y-connected transformer having three windings 10, 12, 14, wherein the transformer is provided with surge arresters 16, 18, 20 each electrically connected from one of the respective phases to ground.

While the configurations shown in FIGS. 1 and 2 provide some protection for the transformer, these configurations do not eliminate induced transient over voltages that may be caused because of, for example, the use of vacuum circuit breakers in order to energize or disconnect an inductive load or to disconnect during transformer inrush current or during a short circuit on the secondary side of the transformer. Likewise, while the arrangement of FIGS. 1 and 2 provide some surge protection, they do not eliminate high stresses that could be reached inside the transformer winding due to internal resonances of the transformer windings.

Figure 3:
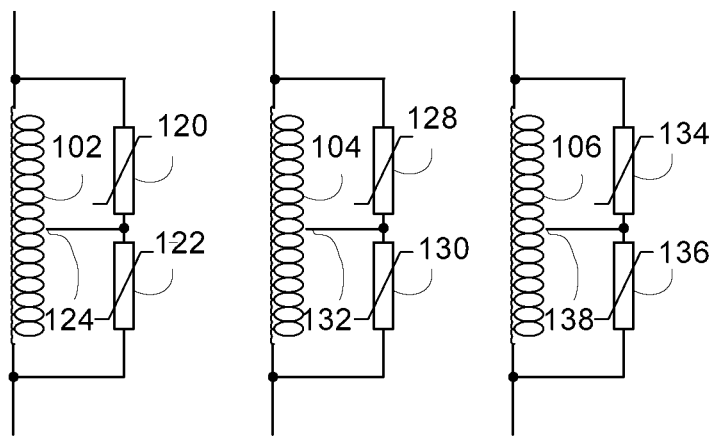
FIG. 3 is a schematic diagram of an advantageous embodiment of the present invention.

FIG. 3 represents one advantageous embodiment of the present invention where three primary windings 102, 104, 106 are illustrated. In this embodiment, a group of series-connected surge arresters 120, 122 are parallel-connected with winding 102; a group of series-connected surge arresters 128, 130 are parallel-connected with winding 104; and a group of series-connected surge arresters 134, 136 are parallel-connected with winding 106.

A center point 124 of the series-connected surge arresters 120, 122 is also electrically connected to a middle location 124a of winding 102. The connection of surge arresters 120, 122 to the midpoint 124a of the winding 102 will function to dampen the main resonance of the winding and prevent over voltages due to, for example, internal resonances.

Surge arresters 128, 130, which are connected in parallel with winding 104 and have a center point 132 that is electrically connected to a middle location 132a of winding 104. Likewise, surge arresters 134, 136 are parallel connected with winding 106 and have a center point 138 that is electrically connected to a middle location 138a of winding 106.

It should be noted that neither the phase connections nor the winding connections are depicted in FIG. 3 as the configuration is usable in different configurations, including, for example, a delta-connected configuration, a Y-connected configuration, and so on.

Figure 4:
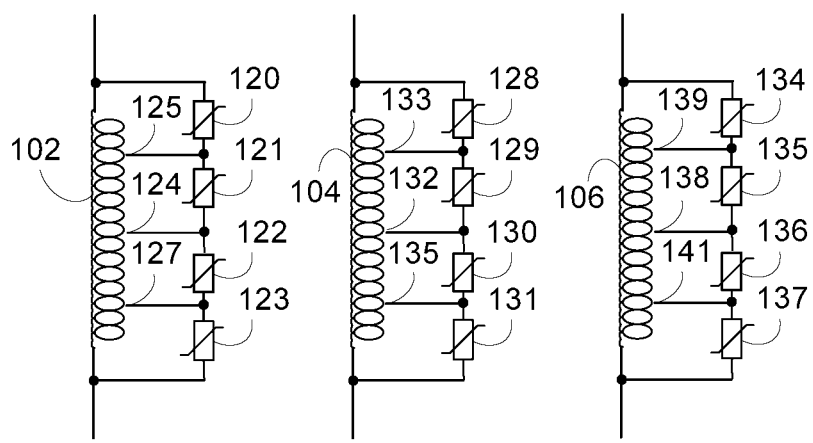
FIG. 4 is a schematic diagram of another advantageous embodiment of the present invention.

FIG. 4 is still another embodiment of the present invention similar to that shown in connection with FIG. 3, however, more than two surge arresters are connected to each winding. In this example, four surge arresters 120, 121, 122, 123 (which may also be annotated as surge arrester 1-1, 1-2, 2-1, 2-2) are series-connected with each other. It will be understood by one of skill in the art that the single surge protector 120 from FIG. 3 may be segmented to function as two surge arrestors as illustrated in FIG. 4. Accordingly, while four surge arrestors are depicted in FIG. 4 and described in connection thereto, this does not preclude surge arrestors 120, 121 comprising a single surge arrestor that is segmented to function as two separate surges arrestors. The same is true with respect to the other surge protectors that are connected in parallel with the various windings.

Additionally, the connection point between surge arresters 120, 121 is electrically connected to a location 125 of winding 102, and the connection point between surge arresters 122, 123 is electrically connected to a location 127 of winding 102.

Four more surge arresters 128, 129, 130, 131 (which may also be annotated as surge arrester 3-1, 3-2, 4-1, 4-2) are depicted series-connected with each other. Additionally, the connection point between surge arresters 128, 129 is electrically connected to a location 133 of winding 104, and the connection point between surge arresters 130, 131 is electrically connected to a location 135 of winding 104. Finally, four additional surge arresters 134, 135, 136, 137 (which may also be annotated as surge arrester 5-1, 5-2, 6-1, 6-2) are depicted series-connected with each other. Additionally, the connection point between surge arresters 134, 135 is electrically connected to a location 139 of winding 106, and the connection point between surge arresters 136, 137 is electrically connected to a location 141 of winding 106. While a particular number of surge arresters has been selected to illustrate the invention, it should be noted that different numbers (e.g., a greater number or a smaller number) of surge arresters may also be utilized as desired.

Again, no phase or winding connections are depicted in FIG. 4 as the configuration is usable in different configurations, including, for example, a delta-connected configuration, a Y-connected configuration, and so on.

Figure 5:
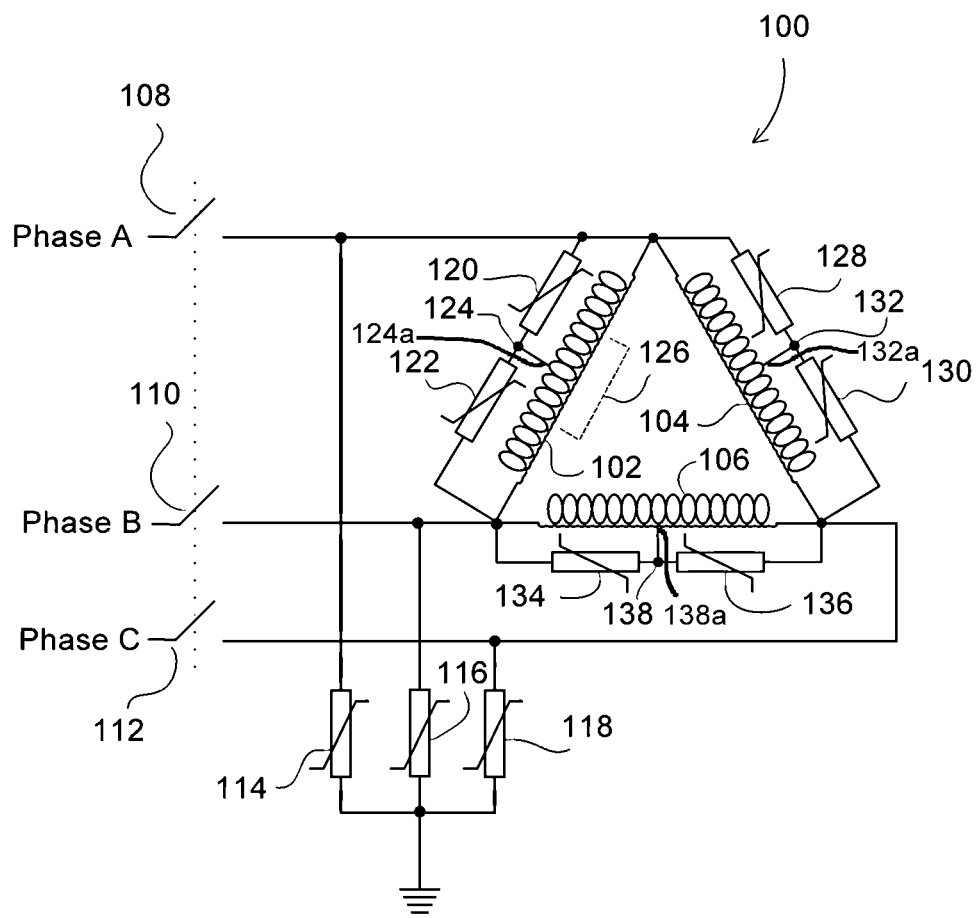
FIG. 5 is a schematic diagram according to FIG. 3.

Turning now to FIG. 5, transient over voltage protection system 100 is depicted. In this configuration, a dry-type three phase delta-connected transformer is shown including three primary windings 102, 104, 106. Also shown in FIG. 5 is a circuit breaker arrangement 108, 110, 112, which is connected to each phase of the three phase transformer respectively. In one embodiment, the circuit breaker arrangement may comprise a vacuum circuit breaker that is controlled by a power system controller (not shown) and connected via a network connection.

Also depicted in FIG. 5 are surge arresters 114, 116, 118 that are connected at one end to each of the respective phases of the three phase transformer and at a second end each are connected to ground.

According to the invention, a group of series-connected surge arresters 120, 122 are parallel-connected with winding 102 between Phase A and Phase B. A center point 124 of the series-connected surge arresters 120, 122 is also electrically connected to a middle location of winding 102.

The center point 124 of the series-connected surge arresters 120, 122 is illustrated in FIG. 5 as being connected to a midpoint of winding 102. However, it should be noted that the center point 124 can be connected to a middle location 126 of winding 102. For example, middle location 126 is illustrated as a dashed bracket that extends along a length of the winding 102. It will be understood that the middle location 126 is not restricted to only being an exact midpoint of winding 102, but could include a range anywhere from about ¼ to about ¾ the length of the winding 102. One of skill in the art would also understand that the sizing of the surge arresters 120, 122 can be selected based on the positioning of the middle location along the length of winding 102. In one embodiment, the surge arresters 120, 122 can be provided with multiple taps allowing for different configurations of the selected middle location. For example, multiple taps may be provided at equal distances such as, 2 taps (⅓ & ⅔) or 3 taps (¼, ½ & ¾). Alternatively, taps could be provided at unequal distances such as, 2 taps (½, ¾) or 3 taps (⅓, ½ & ¾) and so on.

Also shown in FIG. 5 are surge arresters 128, 130, which are connected in parallel with winding 104 and have a center point 132 that is electrically connected to a middle location of winding 104. Likewise, surge arresters 134, 136 are parallel connected with winding 106 and have a center point 138 that is electrically connected to a middle location of winding 106 in a manner previously described in connection with winding 102 above.

Figure 6:
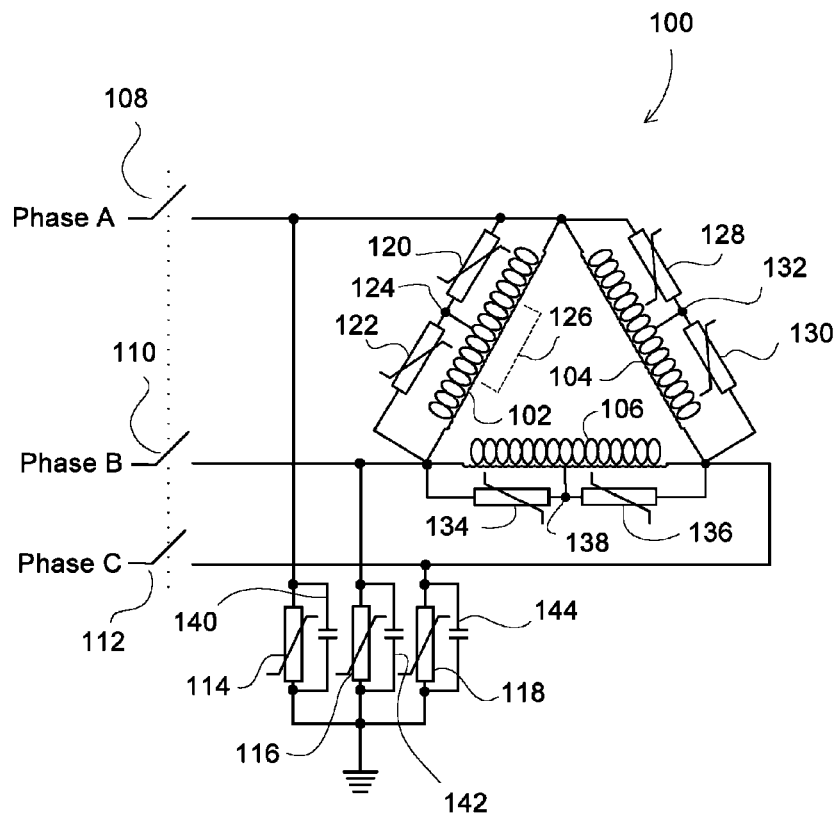
FIG. 6 is a schematic diagram of according to FIG. 5.

FIG. 6 is a schematic diagram of system 100, which is similar to that shown in FIG. 5 but further includes the addition of capacitors 140, 142, 144 (which may be dry-type capacitors) that are each connected in parallel across surge arresters 114, 116, 118 respectively. In this manner, the capacitors 140, 142, 144 are connected from one of each of the three phases to ground providing effective protection for the transformer against multiple circuit breaker re-ignitions. This protection becomes particularly important when the circuit breaker arrangement 108, 110, 112 comprises a vacuum circuit breaker and is opened with inductive loads attached to the system as previously described. Additionally, one of skill in the art will understand that capacitors 140, 142, 144 may comprise either pure capacitors, or damped capacitors that include a resistor in series with each capacitor (so-called RC-snubbers).

Figure 7A:
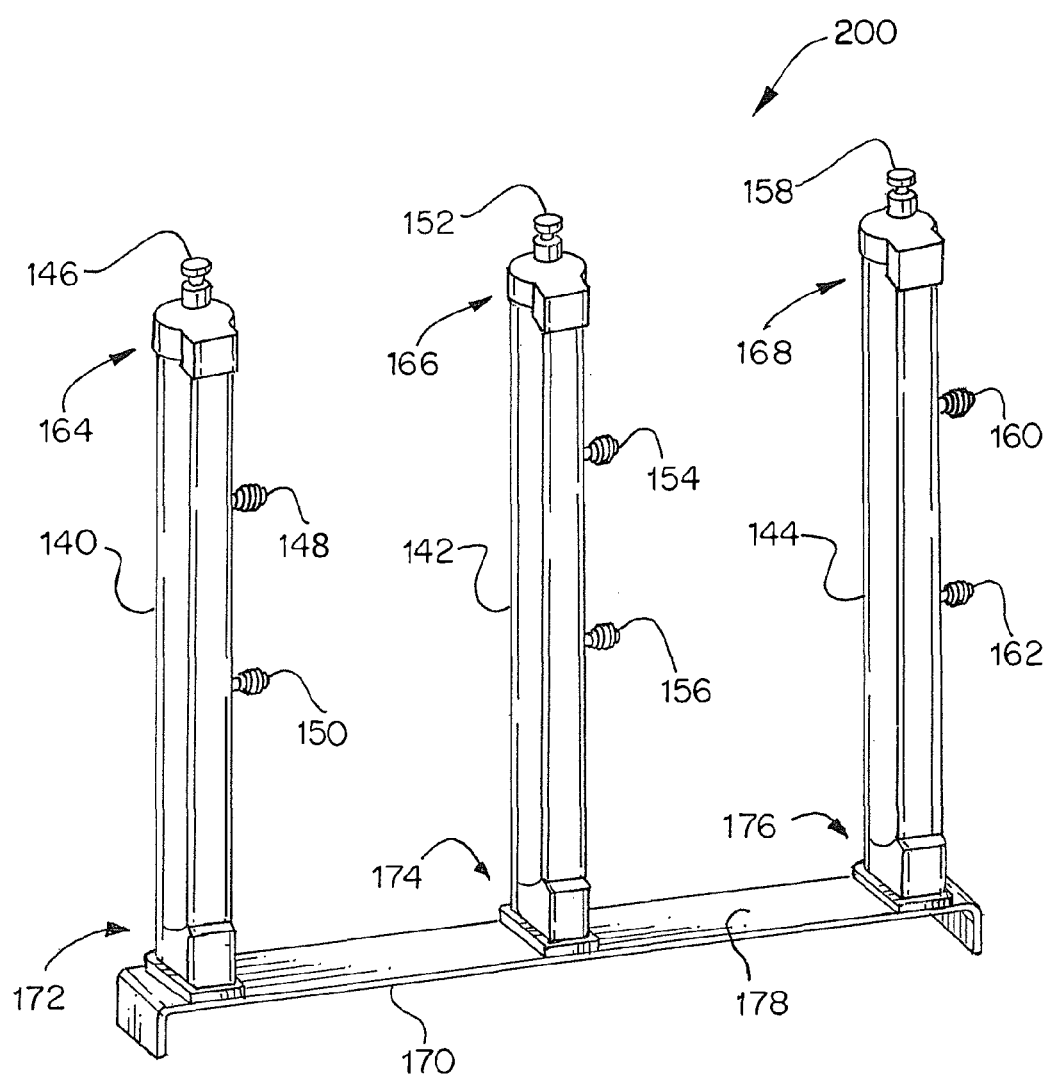
FIG. 7A is a perspective view of an integrated surge arrester system that may be utilized in FIG. 5.

FIG. 7A is an illustration of an integrated surge arrester system 200 in the transient over voltage protection system 100. Here, the nine surge arresters 114, 116, 118, 120, 122, 128, 130, 134, 136 are variously divided into three groups. Each group of series-connected surge arresters are provided in a single housing where surge arresters 116, 120, 122 are positioned in housing 140; surge arresters 118, 134, 136 are positioned in housing 142; and surge arresters 114, 130, 128 are positioned in housing 144.

Also depicted are multiple terminals positioned on each housing. For example, housing 140 is depicted including terminals 146, 148, 150. In this arrangement, terminal 146 corresponds to a first end of surge arrester 120 that may be electrically connected (e.g. as shown in FIG. 5) to Phase A; terminal 148 corresponds to a second end of surge arresters 120, 122 that may comprise center point 124; while terminal 150 corresponds to a first end of surge arrester 122 that may be electrically connected to Phase B (see, FIG. 5). A block diagram of the arrestor block/housing is depicted in FIG. 9A and illustrates one structure of the integrated surge arrestor system 200. It should further be noted that terminal 150 may further comprise a first end of surge arrester 116 that is connected to Phase B while a second end 172 of surge arrester 116 is connected to plate 170, which comprises a ground terminal as it is electrically connected to ground. In this manner, three surge arresters may be provided in the housing 140.

The remaining housings 142 and 144 are similar in structure as described in connection with housing 140. For example, housing 142 includes terminals 152, 154, 156. Terminal 152 corresponds to a first end of surge arrester 134 that may be electrically connected (FIG. 5) to Phase B; terminal 154 corresponds to a second end of surge arresters 134, 136 that may comprise center point 138; while terminal 156 corresponds to a first end of surge arrester 136 that may be electrically connected to Phase C (FIG. 5). It should further be noted that terminal 156 may further comprise a first end of surge arrester 118 that is connected to Phase C while a second end of surge arrester 118 is connected to plate 170 that is electrically connected to ground. Likewise, housing 144 includes terminals 158, 160, 162. In this arrangement, terminal 158 corresponds to a first end of surge arrester 130 that may be electrically connected (FIG. 5) to Phase C; terminal 160 corresponds to a second end of surge arresters 130, 128 that may comprise center point 132; while terminal 162 corresponds to a first end of surge arrester 128 that may be electrically connected to Phase A (FIG. 5). Terminal 162 may further comprise a first end of surge arrester 114 that is connected to Phase A while a second end of surge arrester 114 is connected to plate 170 that is electrically connected to ground.

The housings 140, 142, 144 are generally elongated where the terminals 146, 152, 158 are positioned at first ends 164, 166, 168 of housings 140, 142, 144 respectively. Also depicted in FIG. 7A is plate 170 that, in this embodiment is shaped as an elongated bar, and to which second ends 172, 174, 176 of housings 140, 142, 144 respectively are mechanically and electrically affixed. A ground tap 178 is provided in plate 170 such that a ground connection may quickly and easily be electrically connected to plate 170 to provide a ground connection for surge arresters 114, 116, 118 as previously discussed.

The configurations depicted in FIGS. 5 and 6 provide some distinct advantages including, but not limited to: short electrical connections and low impedances enabling protection against high time derivatives of the over voltages, and increased protection distances and protection levels resulting in lower over voltages.

It should furthermore be understood that the interconnections described in connection with FIG. 7A were described in connection with the delta connected configurations of FIGS. 5 and 6. However, the integrated surge arrester system 200 is equally applicable to other phase orders of a delta connected transformer and to Y connected configurations as will be described in connection with FIGS. 10 and 11.

Figure 7B:
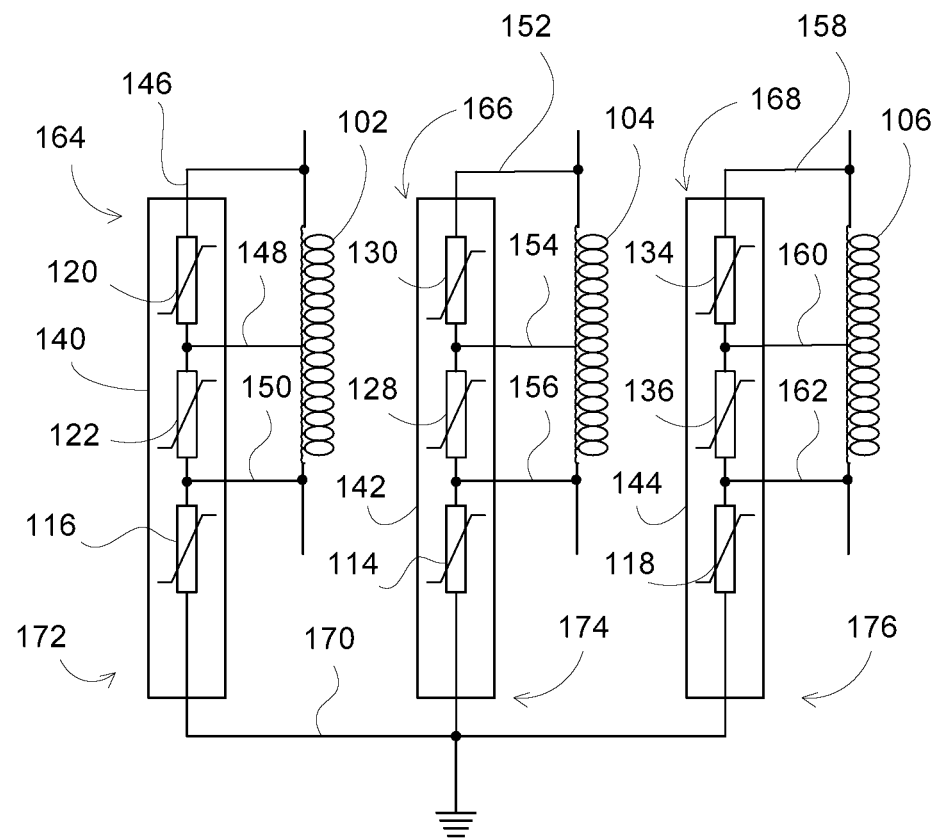
FIG. 7B is a schematic diagram of the integrated surge arrester system according to FIG. 7A.
Figure 7C:
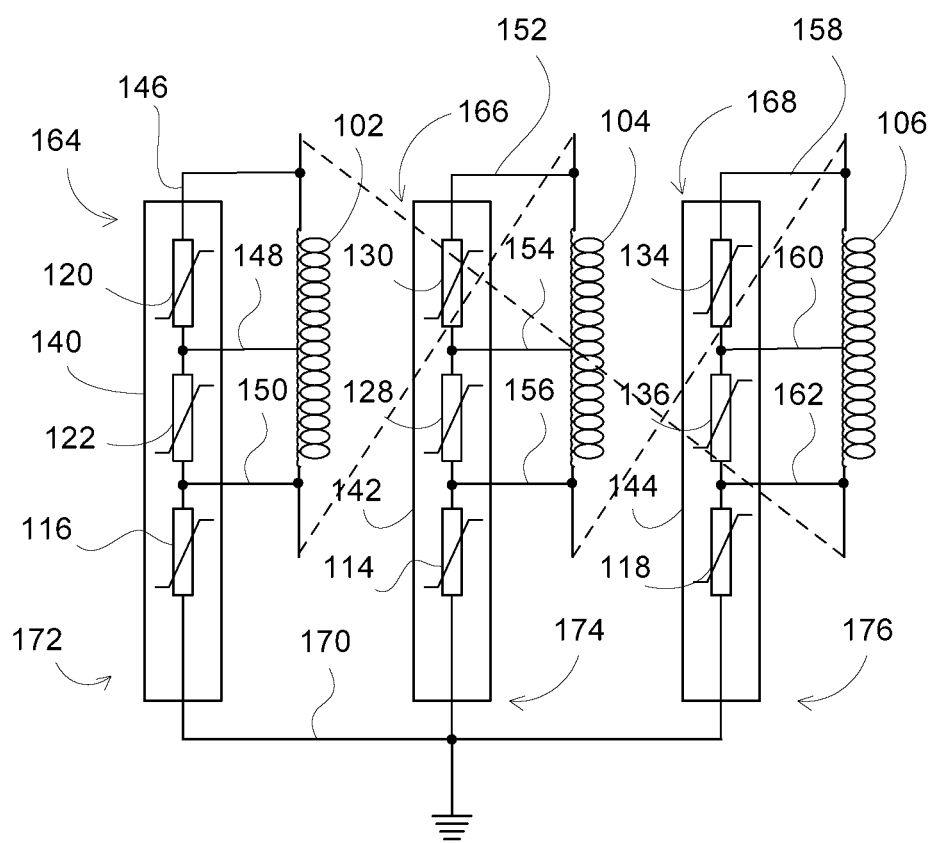
FIG. 7C is a schematic diagram of the integrated surge arrester system in a delta configuration according to FIG. 5.

FIG. 7B is a schematic diagram corresponding to the integrated surge arrester system 200 illustrated in FIG. 7A. As the interconnections have been described in connection with FIG. 7A, they will not be redescribed here.

Figure 7D:
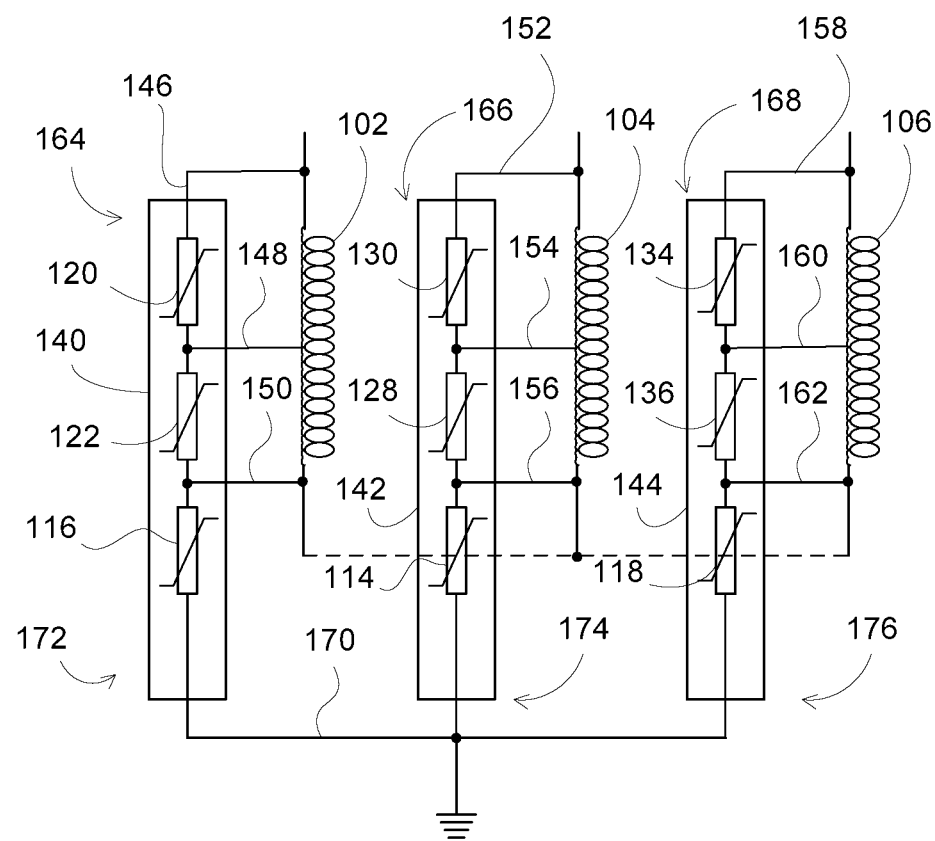
FIG. 7D is a schematic diagram of the integrated surge arrester system in a Y configuration according to FIG. 10.
Figure 7E:
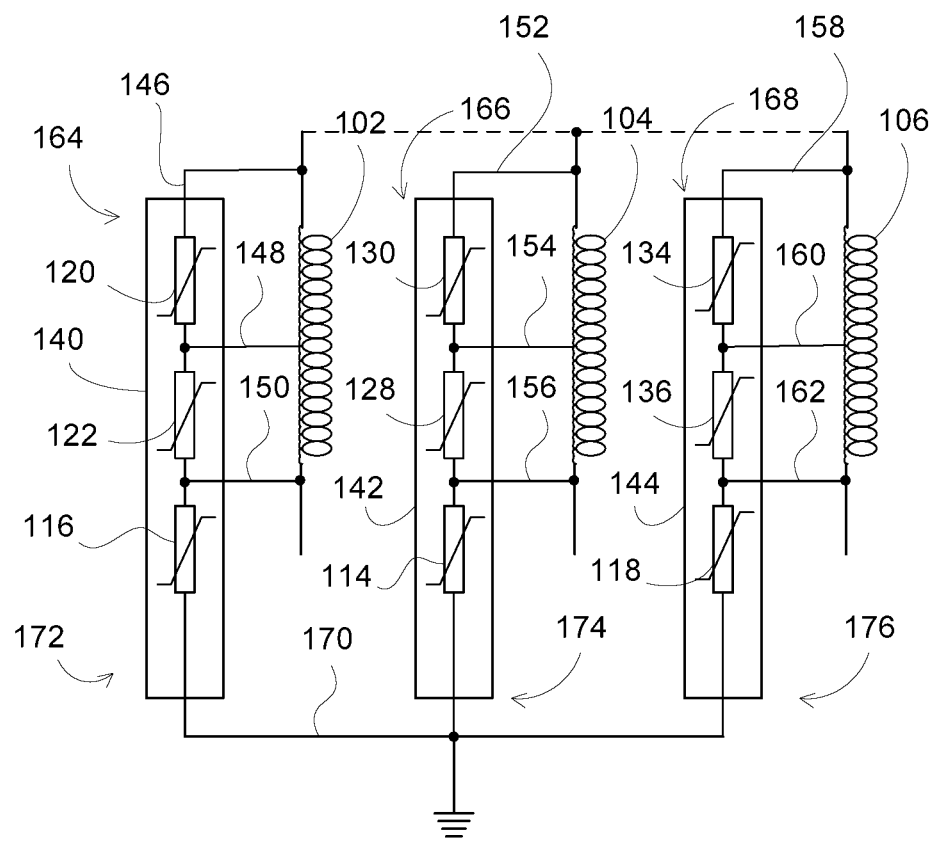
FIG. 7E is a schematic diagram of the integrated surge arrester system in a Y configuration according to FIG. 10.
Figure 7F:
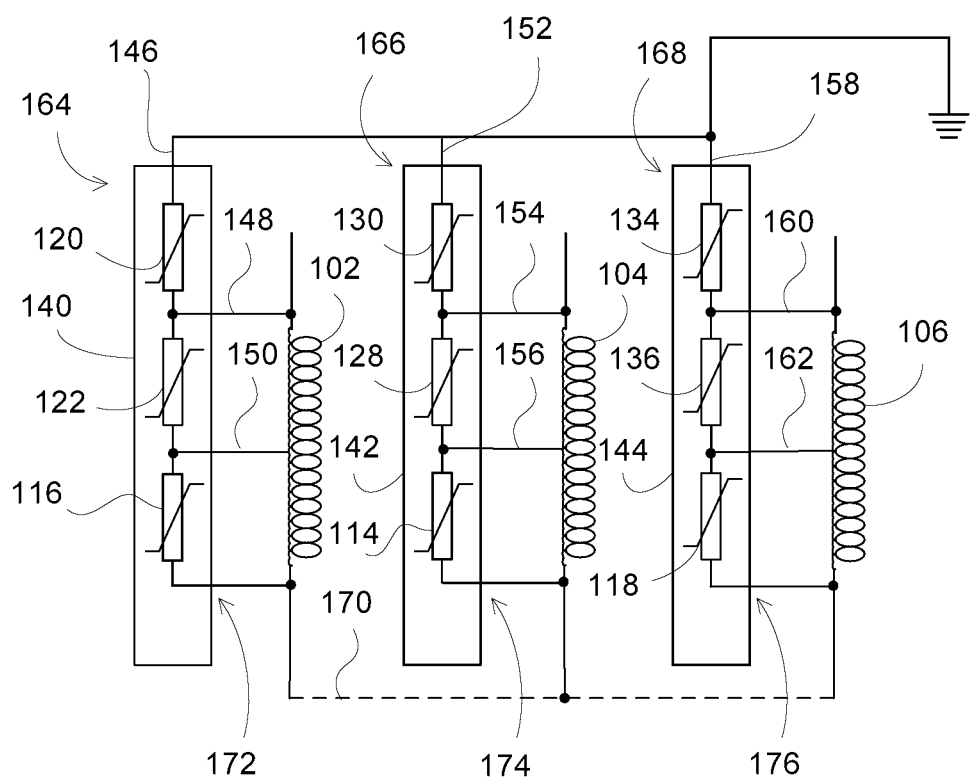
FIG. 7F is a schematic diagram of the integrated surge arrester system in a Y configuration according to FIG. 10.

FIGS. 7C, 7D, 7E and 7F are schematic diagrams according to FIG. 7B, but show interconnections for either a delta connected transformer (FIG. 7C) or for a Y connected transformer (FIGS. 7D, 7E & 7F) as indicated by the dashed lines interconnecting the various coils. As can be seen from the figures, the integrated surge arrester system 200 is usable with differing transformer configurations. In FIG. 7D, the Y connection point is provided along the lower terminals 150, 156, 162; where alternatively, in FIG. 7E, Y connection point is provided along the top terminals 146, 152, 158. Still further, in FIG. 7F, the Y connection is provided along bottom terminals 172, 174, 176 and the phases are accessed at upper terminals 148, 154, 160. As illustrated in FIGS. 7C-7F, there are many differing configurations that can be interconnected as desired and the preceding examples are not meant to exhaust all possible configurations as one of skill in the art could conceive of many differing configurations that may be utilized with the invention.

Turning now to FIGS. 8A-8C, FIG. 8A depicts various metal oxide blocks (labeled "MO") that are stacked to form surge arrestor 120. It should be noted that while housing 140 is discussed in connection with FIG. 8A, the description is also applicable to housings 142, 144. Likewise, metal oxide blocks are stacked to form surge arrestor 122; and metal oxide blocks are stacked to form surge arrestor 116.

The taps 148, 150 provide for electrical connection to the metal oxide blocks at the locations indicated and correspond to terminals 148, 150 respectively. FIGS. 8B and 8C are section views of taps 148, 150 respectively. FIG. 8B indicates that the tap 148 extends completely through the metal plate that forms tap 148; while FIG. 8C indicates that the tap 150 extends only part way through the metal plate that forms tap 150. In this manner, the tap 148 can be used not only for electrical connection to the middle location 126, but also provides for mechanical fixation to winding 102.

Also depicted in FIGS. 8B & 8C is insulation layer 180 that radially surrounds the MO blocks, but with openings to access the metal spacer after molding the insulation layer 180. It is contemplated that the tap 148 that extends through the surge arrester may be used for direct connection to the transformer at tap locations on the windings including, for example, intermediate taps.

Additionally, the orientation of the fixation tap and connection-only tap can differ to allow the shortest connection leads feasible, which improves the overvoltage protection.

It is still further contemplated that one or several tapping spacers can be used and depending on the protection needed, the voltages between the taps do not have to be identical. Likewise, various means for electrical connection can be utilized including, for example, plug-in, (friction) welding, riveting, "shooting in" of connection (e.g. through the insulation), the application of threading after the molding process, the drilling of a hole through the spacer after molding to form the tap, etc.

The MO-blocks can also be selected depending on the required protection level and energy handling needs. As one example, the use of high field MO-blocks provides a compact arrester configuration even when used with higher system voltages.

Turning now to FIGS. 9A-9D, multi-terminal surge arresters (e.g. 3 or 4 terminals) of various configurations are illustrated. These surge arresters can be assembled or affixed directly on the coils, the yoke, the frame, housing or winding of the transformer. For example, the system illustrated in FIG. 9A essentially corresponds to the embodiment depicted in FIG. 7, while the system in FIG. 9B corresponds to a differing embodiment where instead of connecting the second ends of surge arresters 114, 116, 118 to a mounting plate, the second ends can be connected via a cable connection. In this manner, the individual housings 140, 142, 144 may each be individually mechanically and electrically connected/affixed to the transformer windings.

FIGS. 9C and 9D show still another embodiment where, instead of having individual housings, the surge arresters are positioned in a monolithic structure (FIG. 9D shows a top view of FIG. 9C). This embodiment provides for a single compact device and may or may not have an integrated mounting plate for connection to ground.

Figure 10:
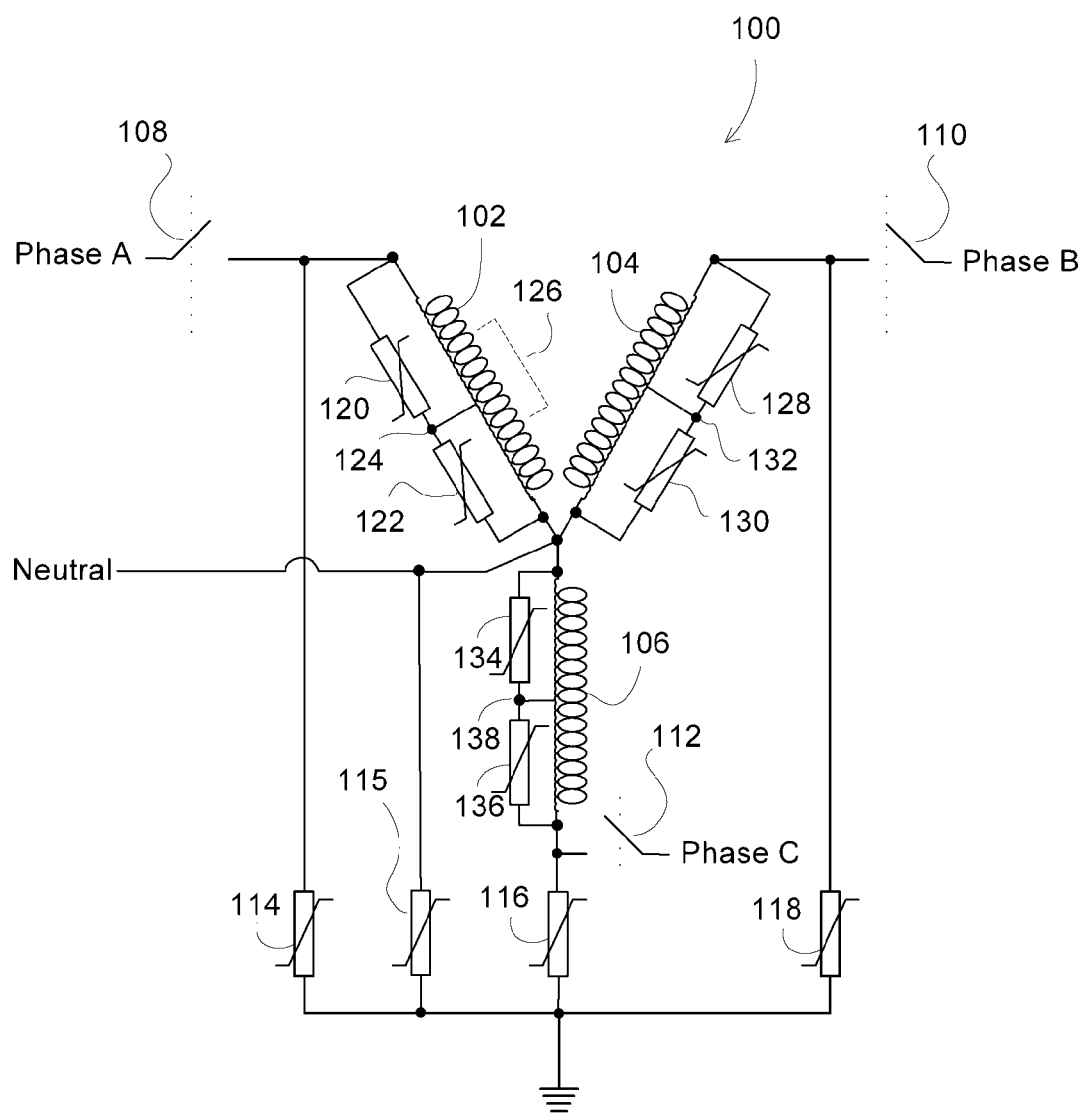
FIG. 10 is a schematic diagram according to FIG. 3.

FIG. 10 depicts another configuration of the transient over voltage protection system 100. In this configuration, a dry-type three phase Y-connected transformer is shown including three primary windings 102, 104, 106. A circuit breaker arrangement 108, 110, 112 is also shown, which is connected to each phase of the three phase transformer respectively as indicated by the dotted line. As stated previously, the circuit breaker arrangement may comprise a vacuum circuit breaker that is controlled by a power system controller (not shown) and connected via a network connection.

Surge arresters 114, 116, 118 are shown connected at one end to each of the respective phases of the three phase transformer and at a second end each are connected to ground. Also shown in FIG. 10 is surge arrester 115, which is used in the Y connected configuration and is electrically connected from the neutral point to ground.

A group of series-connected surge arresters 120, 122 are series-connected with each other and connected across winding 102 between Phase A and the neutral point connection. A center point 124 of the series-connected surge arresters 120, 122 is also electrically connected to a middle location of winding 102.

The center point 124 of the series-connected surge arresters 120, 122 is shown connected to a midpoint of winding 102. As stated previously, the center point 124 can be connected to a middle location 126 of winding 102. The middle location 126 is illustrated as a dashed bracket that extends along a length of the winding 102. It will be understood that the middle location 126 is not restricted to only being an exact midpoint of winding 102, but could include a range anywhere from about ¼ to about ¾ the length of the winding 102. One of skill in the art will further understand that the sizing of the surge arresters 120, 122 can be selected based on the positioning of the middle location along the length of winding 102. In one embodiment, the surge arresters 120, 122 can be provided with multiple taps allowing for different configurations of the selected middle location. For example, multiple taps may be provided at equal distances such as, 2 taps (⅓ & ⅔) or 3 taps (¼, ½ & ¾). Alternatively, taps could be provided at unequal distances such as, 2 taps (½, ¾) or 3 taps (⅓, ½ & ¾) and so on.

Surge arresters 128, 130 are connected across winding 104 as shown in FIG. 10 and have a center point 132 that is electrically connected to a middle location of winding 104. Likewise, surge arresters 134, 136 are connected across winding 106 as indicated and have a center point 138 that is electrically connected to a middle location of winding 106 in a manner previously described in connection with winding 102 above.

Figure 11:
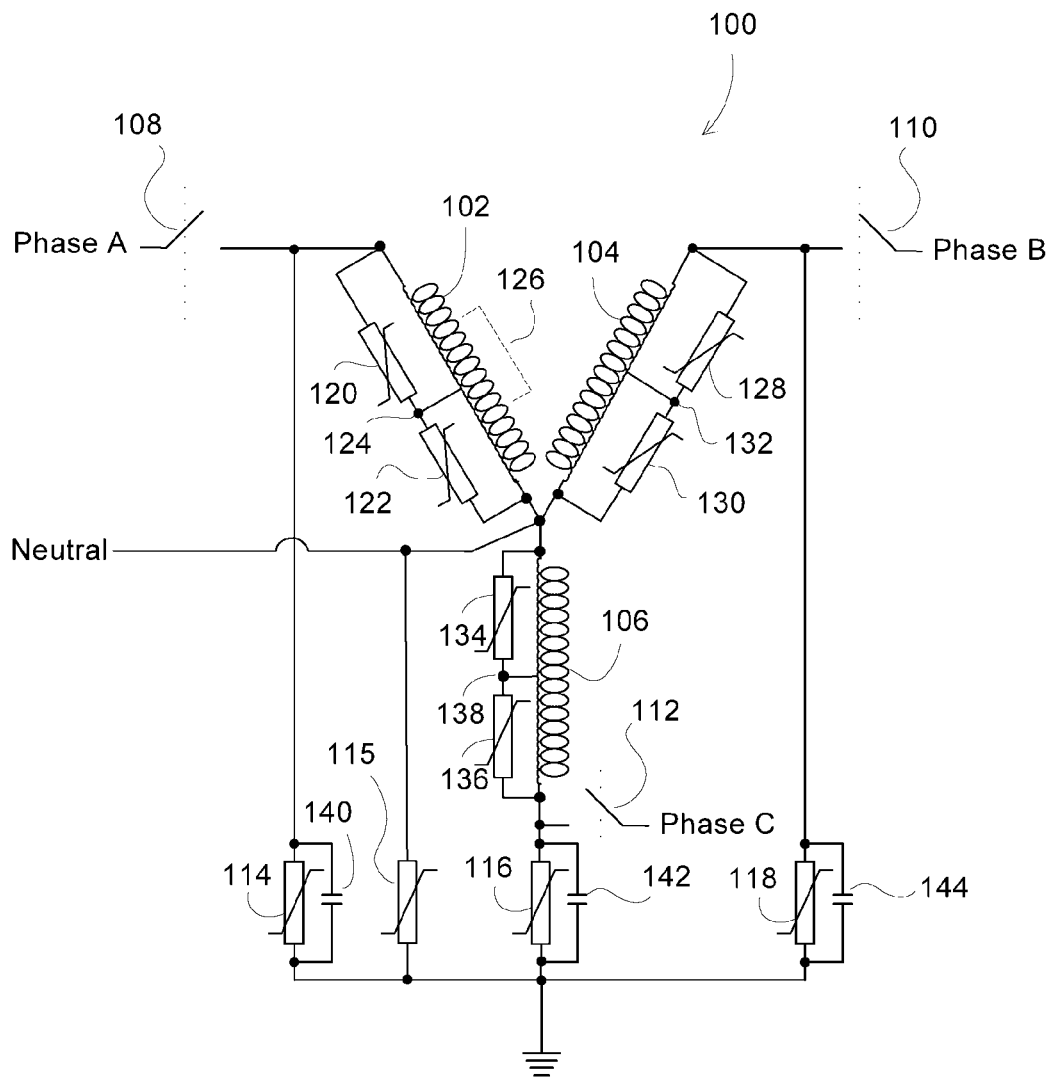
FIG. 11 is a schematic diagram according to FIG. 10.

Turning now to FIG. 11, the structure is similar to FIG. 10 however, capacitors 140, 142, 144 have been added to the structure.

Capacitors 140, 142, 144 (which may be dry-type capacitors) are each connected in parallel across surge arresters 114, 116, 118 respectively. In this manner, the capacitors 140, 142, 144 are connected from one of each of the three phases to ground providing effective protection for the transformer against multiple circuit breaker re-ignitions. This protection becomes particularly important when the circuit breaker arrangement 108, 110, 112 comprises a vacuum circuit breaker and is opened with inductive loads as previously described attached to the system.

While various configurations for the surge protectors and winding configurations have been depicted in the Figures (Delta-connected FIGS. 5 & 6; Y-connected FIGS. 10 & 11), it is conceived that the inventive concept may be utilized with many differing configurations.

Figure 12A:
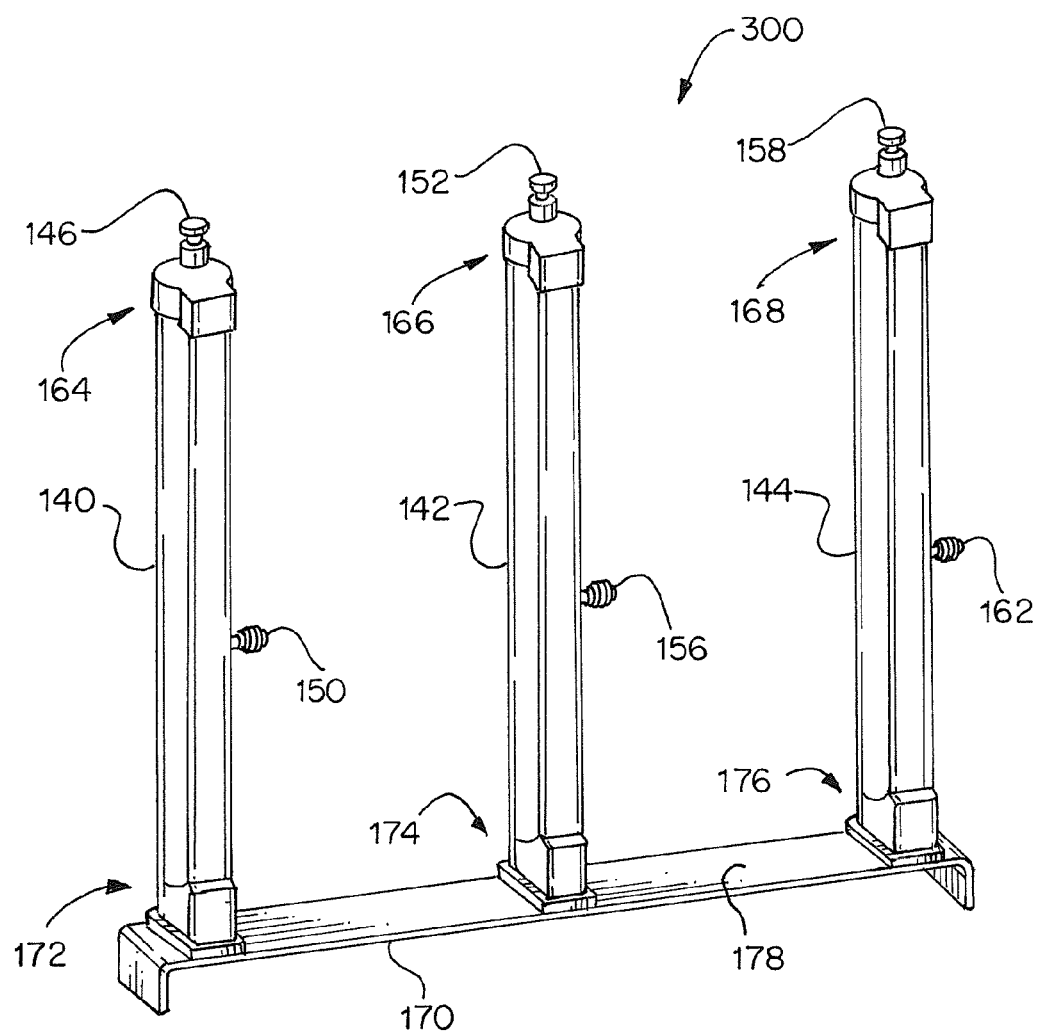
FIG. 12A is a perspective view of an integrated surge arrester system that may be utilized in FIG. 3.
Figure 12B:
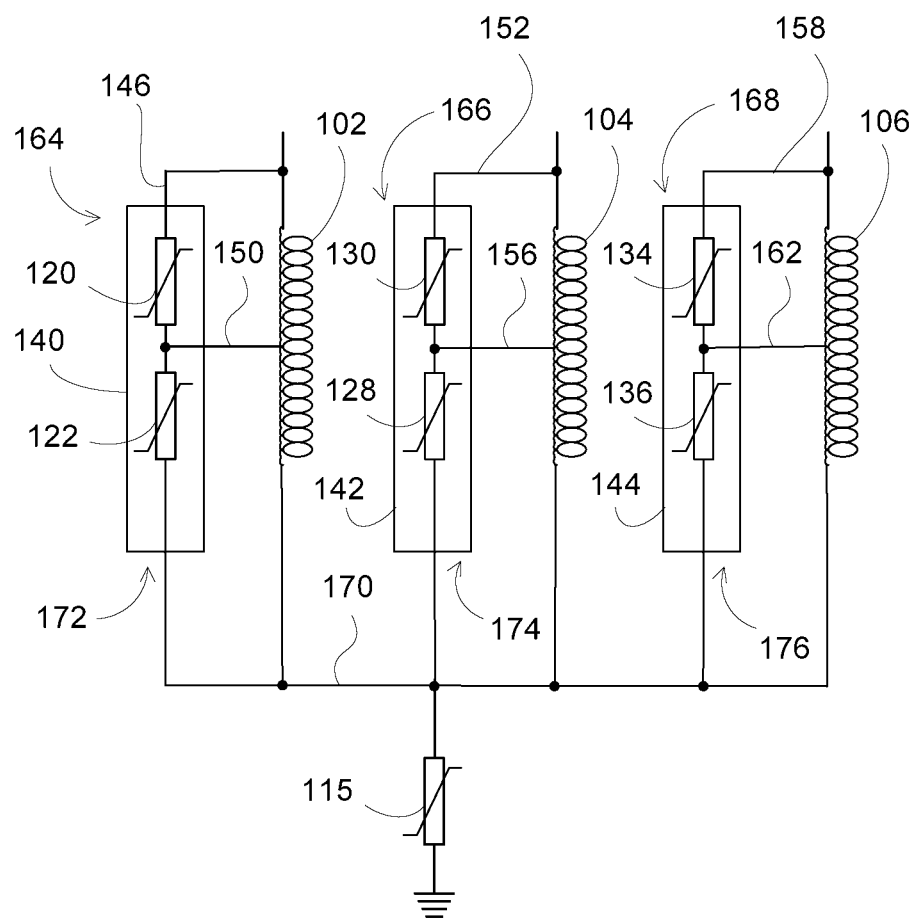
FIG. 12B is a schematic diagram according to FIG. 12A and including a surge protector to ground.

Referring now to FIGS. 12A & 12B, an illustration of an integrated surge arrester system 300 in the transient over voltage protection system 100 is presented (FIG. 12A) along with a corresponding schematic diagram (FIG. 12B). Integrated surge arrester system 300 is similar to integrated surge arrester system 200 with the exception of rather than each housing 140, 142, 144 including three surge arresters, the housings 140, 142, 144 each comprise two surge arresters. Another surge arrester 115 is connected between the Y point connection and ground.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for transient over voltage protection of a three-phase transformer, the system comprising:
   a dry-type transformer including first, second and third windings, each of the first, second and third windings having winding terminals;

a plurality of surge arresters divided into first, second and third groups, the first group of surge arresters connected across the first winding, the second group of surge arresters connected across the second winding, and the third group of surge arresters connected across the third winding;

each surge arrester of the first group being connected to at least one intermediate location along the first winding, the winding terminals of the first winding being connected to different surge arresters of the first group;

each surge arrester of the second group being connected to at least one intermediate location along the second winding, the winding terminals of the second winding being connected to different surge arresters of the second group; and each surge arrester of the third group being connected to at least one intermediate location along the third winding, the winding terminals of the third winding being connected to different surge arresters of the third group.

2. The system according to claim 1, wherein the first, second and third windings are interconnected in one of: a delta-connected configuration or a Y-connected configuration.

3. The system according to claim 2, further comprising:
three surge arresters each having a first end and a second end;
the first ends being electrically connected to a start winding terminal or an end winding terminal of the first winding, second winding and third winding, respectively;
the second ends being electrically connected to ground.

4. The system according to claim 1, further comprising circuit breakers coupled to each phase of the dry-type transformer.

5. The system according to claim 4 wherein the circuit breakers comprise vacuum circuit breakers.

6. The system according to claim 3, wherein the surge arresters of the first group are positioned in a first housing, the surge arresters of the second group are positioned in a second housing, and the surge arresters of the third group are positioned in a third housing.

7. The system according to claim 6, wherein each of the first, second and third housings comprises first and second ends, and the second end of each of the first, second and third housings is mechanically connected to a plate.

8. The system according to claim 6, wherein the first group comprises a first surge arrester and a second surge arrester, the second group comprises a third surge arrester and a fourth surge arrester, and the third group comprises a fifth surge arrester and a sixth surge arrester; and
wherein the first housing comprises at least three terminals, a first terminal corresponding to a first end of the first surge arrester, a second terminal corresponding to second ends of the first and second surge arresters, and a third terminal corresponding to a first end of the second surge arrester.

9. The system according to claim 8, wherein said three surge arresters comprise a seventh surge arrester, an eighth surge arrester, and a ninth surge arrester, said seventh surge arrester is positioned in the first housing, and the first housing further comprises a fourth terminal, wherein the third terminal corresponds to a first end of the seventh surge arrester and the fourth terminal corresponds to a second end of the seventh surge arrester.

10. The system according to claim 9, wherein the second housing comprises at least three terminals, a first terminal of the second housing corresponding to a first end of the third surge arrester, a second terminal of the second housing corresponding to second ends of the third and fourth surge arresters, and a third terminal of the second housing corresponding to a first end of the fourth surge arrester.

11. The system according to claim 10, wherein said eighth surge arrester is positioned in the second housing, and the second housing further comprises a fourth terminal, wherein the third terminal of the second housing corresponds to a first end of the eighth surge arrester and the fourth terminal of the second housing corresponds to a second end of the eighth surge arrester.

12. The system according to claim 11, wherein the third housing comprises at least three terminals, a first terminal of the third housing corresponding to a first end of the fifth surge arrester, a second terminal of the third housing corresponding to second ends of the fifth and sixth surge arresters, and a third terminal of the third housing corresponding to a first end of the sixth surge arrester.

13. The system according to claim 12, wherein said ninth surge arrester is positioned in the third housing, and the third housing further comprises a fourth terminal, wherein the third terminal of the third housing corresponds to a first end of the ninth surge arrester and the fourth terminal of the third housing corresponds to a second end of the ninth surge arrester.

14. The system according to claim 13, wherein the fourth terminals of the first, second and third housings are electrically connected to said plate.

15. The system according to claim 14 wherein the plate is electrically connected to ground.

16. The system according to claim 14, wherein the plate is electrically connected to the end winding terminals of the first, second and third windings.

17. The system according to claim 1, wherein each of the first, second and third windings has a start winding terminal and an end winding terminal, and a distance from the start winding terminal to the end winding terminal is length (L), wherein the intermediate location of the first, second and third windings is located in a range of from L/4 to 3(L/4).

18. A system for transient over voltage protection of a three-phase, delta-connected transformer, the transformer including first, second and third windings, the system comprising:
a first surge arrester having first and second ends;
a second surge arrester having first and second ends;
said first end of said first surge arrester electrically connected to a first end of the first winding, and the second end of the first surge arrester electrically connected to an intermediate location of the first winding;
said first end of said second surge arrester electrically connected to a second end of the first winding, and the second end of the second surge arrester electrically connected to the intermediate location of the first winding;
a third surge arrester having first and second ends;
a fourth surge arrester having first and second ends;
said first end of said third surge arrester electrically connected to a first end of the second winding, and the second end of the third surge arrester electrically connected to an intermediate location of the second winding;
said first end of said fourth surge arrester electrically connected to a second end of the second winding, and the second end of the fourth surge arrester electrically connected to the intermediate location of the second winding;
a fifth surge arrester having first and second ends;

a sixth surge arrester having first and second ends;
said first end of said fifth surge arrester electrically connected to a first end of the third winding, and the second end of the fifth surge arrester electrically connected to an intermediate location of the third winding;
said first end of said sixth surge arrester electrically connected to a second end of the third winding, and the second end of the sixth surge arrester electrically connected to the intermediate location of the third winding;
a seventh surge arrester electrically connected at a first end to a connection point between the first and second windings;
an eighth surge arrester electrically connected at a first end to a connection point between the first and third windings;
a ninth surge arrester electrically connected at a first end to a connection point between the second and third windings;
second ends of said seventh, eighth and ninth surge arresters each electrically connected to ground;
a first capacitor electrically connected in parallel with said seventh surge arrester;
a second capacitor electrically connected in parallel with said eighth surge arrester; and
a third capacitor electrically connected in parallel with said ninth surge arrester.

19. The system according to claim 18 wherein said first, second and third capacitors comprise dry-type capacitors.

20. A system for transient over voltage protection of a three-phase, delta-connected transformer, the transformer including first, second and third windings, the system comprising:
a first surge arrester having first and second ends;
a second surge arrester having first and second ends;
said first end of said first surge arrester electrically connected to a first end of the first winding, and the second end of the first surge arrester electrically connected to an intermediate location of the first winding;
said first end of said second surge arrester electrically connected to a second end of the first winding, and the second end of the second surge arrester electrically connected to the intermediate location of the first winding;
a third surge arrester having first and second ends;
a fourth surge arrester having first and second ends;
said first end of said third surge arrester electrically connected to a first end of the second winding, and the second end of the third surge arrester electrically connected to an intermediate location of the second winding;
said first end of said fourth surge arrester electrically connected to a second end of the second winding, and the second end of the fourth surge arrester electrically connected to the intermediate location of the second winding;
a fifth surge arrester having first and second ends; and
a sixth surge arrester having first and second ends;
said first end of said fifth surge arrester electrically connected to a first end of the third winding, and the second end of the fifth surge arrester electrically connected to an intermediate location of the third winding;
said first end of said sixth surge arrester electrically connected to a second end of the third winding, and the second end of the sixth surge arrester electrically connected to the intermediate location of the third winding;
said first surge arrestor comprises two series-connected surge arrestors (1-1) and (1-2);
said second surge arrestor comprises two series-connected surge arrestors (2-1) and (2-2);
said surge arrestor (1-1) has a first end electrically connected to the first end of the first winding and said surge arrestor (1-2) has a second end electrically connected to the intermediate location of the first winding;
said surge arrestor (1-1) has a second end electrically connected to a first end of said surge arrestor (1-2) and to a location along the first winding between the first end and the intermediate location;
said surge arrestor (2-2) has a second end electrically connected to the second end of the first winding and said surge arrestor (2-1) has a first end electrically connected to the intermediate location of the first winding; and
said surge arrestor (2-1) has a second end electrically connected to a first end of said surge arrestor (2-2) and to a location along the first winding between the second end and the intermediate location.

21. A system for transient over voltage protection of a three-phase, Y-connected transformer, the transformer including first, second and third windings, the system comprising:
a first surge arrester having first and second ends;
a second surge arrester having first and second ends;
said first end of said first surge arrester electrically connected to a first end of the first winding, and the second end of the first surge arrester electrically connected to an intermediate location of the first winding;
said first end of said second surge arrester electrically connected to a second end of the first winding, and the second end of the second surge arrester electrically connected to the intermediate location of the first winding;
a third surge arrester having first and second ends;
a fourth surge arrester having first and second ends;
said first end of said third surge arrester electrically connected to a first end of the second winding, and the second end of the third surge arrester electrically connected to an intermediate location of the second winding;
said first end of said fourth surge arrester electrically connected to a second end of the second winding, and the second end of the fourth surge arrester electrically connected to the intermediate location of the second winding;
a fifth surge arrester having first and second ends; and
a sixth surge arrester having first and second ends;
said first end of said fifth surge arrester electrically connected to a first end of the third winding, and the second end of the fifth surge arrester electrically connected to an intermediate location of the third winding;
said first end of said sixth surge arrester electrically connected to a second end of the third winding, and the second end of the sixth surge arrester electrically connected to the intermediate location of the third winding;
said first surge arrestor comprises two series-connected surge arrestors (1-1) and (1-2);
said second surge arrestor comprises two series-connected surge arrestors (2-1) and (2-2);
said surge arrestor (1-1) has a first end electrically connected to the first end of the first winding and said surge arrestor (1-2) has a second end electrically connected to the intermediate location of the first winding;
said surge arrestor (1-1) has a second end electrically connected to a first end of said surge arrestor (1-2) and to a location along the first winding between the first end and the intermediate location;

said surge arrestor (2-2) has a second end electrically connected to the second end of the first winding and said surge arrestor (2-1) has a first end electrically connected to the intermediate location of the first winding; and said surge arrestor (2-1) has a second end electrically connected to a first end of said surge arrestor (2-2) and to a location along the first winding between the second end and the intermediate location.

22. The system according to claim 21 wherein, said third surge arrestor comprises two series-connected surge arrestors (3-1) and (3-2);

said fourth surge arrestor comprises two series-connected surge arrestors (4-1) and (4-2);

wherein surge arrestor (3-1) has a first end electrically connected to the first end of the second winding and surge arrestor (3-2) has a second end electrically connected to the intermediate location of the second winding;

said surge arrestor (3-1) has a second end electrically connected to a first end of surge arrestor (3-2) and to a location along the second winding between the first end and the intermediate location;

wherein surge arrestor (4-2) has a second end electrically connected to the second end of the second winding and surge arrestor (4-1) has a first end electrically connected to the intermediate location of the second winding;

said surge arrestor (4-1) has a second end electrically connected to a first end of surge arrestor (4-2) and to a location along the second winding between the second end and the intermediate location.

23. The system according to claim 22 wherein, said fifth surge arrestor comprises two series-connected surge arrestors (5-1) and (5-2);

said sixth surge arrestor comprises two series-connected surge arrestors (6-1) and (6-2);

wherein surge arrestor (5-1) has a first end electrically connected to the first end of the third winding and surge arrestor (5-2) has a second end electrically connected to the intermediate location of the third winding;

said surge arrestor (5-1) has a second end electrically connected to a first end of surge arrestor (5-2) and to a location along the third winding between the first end and the intermediate location;

wherein surge arrestor (6-2) has a second end electrically connected to the second end of the third winding and surge arrestor (6-1) has a first end electrically connected to the intermediate location of the third winding;

said surge arrestor (6-1) has a second end electrically connected to a first end of surge arrestor (6-2) and to a location along the third winding between the second end and the intermediate location.

24. A system for transient over voltage protection of a three-phase transformer, the system comprising:

a transformer including first, second and third windings, each of the first, second and third windings having winding terminals;

a plurality of surge arresters divided into first, second and third groups, the first group of surge arresters connected across the first winding, the second group of surge arresters connected across the second winding, and the third group of surge arresters connected across the third winding;

each surge arrester of the first group being connected to at least one intermediate location along the first winding, the winding terminals of the first winding being connected to different surge arresters of the first group;

each surge arrester of the second group being connected to at least one intermediate location along the second winding, the winding terminals of the second winding being connected to different surge arresters of the second group; and each surge arrester of the third group being connected to at least one intermediate location along the third winding, the winding terminals of the third winding being connected to different surge arresters of the third group; and circuit breakers coupled to each phase of the transformer;

wherein the plurality of surge arresters protect the transformer against multiple re-ignitions of the circuit breakers;

wherein the connection of each surge arrester to the at least one intermediate location along the respective first winding, second winding, and third winding damps internal resonances of the first winding, second winding, and third winding.

25. The system according to claim 24, further comprising:

a first housing enclosing the first group of surge arresters, a second housing enclosing the second group of surge arresters, and a third housing enclosing the third group of surge arresters; and a plate on which the first, second and third housings are affixed.

26. The system according to claim 25 wherein each of the first, second and third windings has a start winding terminal and an end winding terminal, and a distance from the start winding terminal to the end winding terminal is length (L), wherein the intermediate location of the first, second and third windings is located in a range of from L/4 to 3(L/4).

27. The system according to claim 25, wherein the first, second and third housings each comprise first, second and third terminals; and wherein for each of the first, second and third housings, the first terminal corresponds to an end of one surge arrester in the respective group, the second terminal corresponds to the intermediate location of the respective group, and the third terminal corresponds to an end of another surge arrester in the respective group.

28. The system according to claim 27 wherein the first, second and third housings each comprise at least one arrester tap, which corresponds to the second terminal.

29. The system according to claim 28 wherein said at least one arrester tap provides for both an electrical connection and mechanical fixation.

30. The system according to claim 28 wherein said at least one arrester tap comprises a metal plate.

31. The system according to claim 24 further comprising:

three surge arresters each having a first end and a second end;

the first ends being electrically connected to a start winding terminal or an end winding terminal of the first winding, second winding and third winding, respectively;

the second ends being electrically connected to ground.

32. The system according to claim 31, wherein each of said three surge arresters is positioned in one of the first, second and third housings.

33. The system according to claim 32, wherein the second ends of said three surge arresters are each electrically connected to said plate.

34. The system according to claim 31, further comprising:
a first capacitor electrically connected in parallel with a first one of said three surge arresters;
a second capacitor electrically connected in parallel with a second one of said three surge arresters; and
a third capacitor electrically connected in parallel with a third one of said three surge arresters.

35. The system according to claim 34 wherein said first, second and third capacitors comprise dry-type capacitors.

36. The system according to claim 24 wherein said first, second and third groups of surge arresters are contained within a single monolithic enclosure.

37. The system according to claim 24 wherein said transformer comprises a dry-type transformer.

38. The system according to claim 24 wherein said transformer is one of: a delta-connected transformer or a Y-connected transformer.

\* \* \* \* \*